(12) United States Patent
Sample

(10) Patent No.: US 9,391,863 B2
(45) Date of Patent: Jul. 12, 2016

(54) SERVER RESOURCE MANAGEMENT, ANALYSIS, AND INTRUSION NEGOTIATION

(71) Applicant: Palo Alto Networks, Inc., Santa Clara, CA (US)

(72) Inventor: Char Sample, Ellicott City, MD (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 14/271,264

(22) Filed: May 6, 2014

(65) Prior Publication Data

US 2014/0365643 A1    Dec. 11, 2014

Related U.S. Application Data

(60) Continuation of application No. 13/790,198, filed on Mar. 8, 2013, now Pat. No. 8,763,119, which is a division of application No. 12/027,210, filed on Feb. 6, 2008, now Pat. No. 8,397,296, which is a continuation of application No. 10/290,961, filed on Nov. 8, 2002, now Pat. No. 7,353,538.

(51) Int. Cl.
*G06F 11/30* (2006.01)
*G08B 23/00* (2006.01)
(Continued)

(52) U.S. Cl.
CPC .......... *H04L 43/0876* (2013.01); *G06F 9/5016* (2013.01); *G06F 11/3495* (2013.01); *H04L 12/2602* (2013.01); *H04L 41/50* (2013.01); *H04L 43/16* (2013.01); *H04L 63/1458* (2013.01); *H04L 67/1008* (2013.01); *H04L 67/1012* (2013.01); *H04L 69/162* (2013.01);
(Continued)

(58) Field of Classification Search
CPC ... H04L 43/16; H04L 67/1008; H04L 41/046; H04L 43/045; H04L 67/1012; H04L 41/0681; H04L 43/10; H04L 43/14; H04L 43/0876; H04L 63/1458; H04L 43/0817; H04L 67/14; H04L 41/5009; H04L 41/50; H04L 69/162; H04L 12/2602; H04L 2012/5632; H04L 2012/5636; H04L 67/1031; H04L 67/1002; G06F 11/3495; G06F 9/505; G06F 11/3409; G06F 2201/81; G06F 9/5083; G06F 11/3433; G06F 21/552; G06F 11/3055; G06F 21/55; G06F 2209/5018; G06F 2209/5022; G06F 9/50; G06F 9/5011; G06F 9/5055

See application file for complete search history.

(56) References Cited

U.S. PATENT DOCUMENTS 5,764,645 A * 6/1998 Bernet et al. ............. 370/395.52
5,822,534 A * 10/1998 Yamunachari et al. ....... 709/224
(Continued)

OTHER PUBLICATIONS

Carleton University. "Managing your Unix Disk Quota," Carieton University Schooi of Mathematics and Statistics, http://mathstat.carletQn.ca/~heip/quota/quota.htmi, five pages, Aug. 22, 2002.*
(Continued)

*Primary Examiner* — Michael Simitoski
(74) *Attorney, Agent, or Firm* — Van Pelt, Yi & James LLP

(57) ABSTRACT

A console host and intrusion negation system (CHAINS) includes a host component and a console component. The host component monitors resources at a server. Resources that are becoming overloaded can be throttled back. Reports relating to resource usage may be transmitted to the console component. At the console component, resource reports from multiple host components may be viewed and managed.

19 Claims, 6 Drawing Sheets

(51) Int. Cl.

| | | |
|---|---|---|
| *H04L 12/26* | (2006.01) | |
| *H04L 29/06* | (2006.01) | |
| *G06F 9/50* | (2006.01) | |
| *H04L 29/08* | (2006.01) | |
| *H04L 12/24* | (2006.01) | |
| *G06F 12/14* | (2006.01) | |
| *G06F 11/34* | (2006.01) | |

(52) U.S. Cl.
CPC ......... *G06F 11/3409* (2013.01); *G06F 2201/81* (2013.01)

(56) References Cited

U.S. PATENT DOCUMENTS

| | | | | |
|---|---|---|---|---|
| 5,862,333 | A * | 1/1999 | Graf | 709/223 |
| 5,951,694 | A * | 9/1999 | Choquier et al. | 714/15 |
| 6,026,440 | A * | 2/2000 | Shrader et al. | 709/224 |
| 6,148,335 | A * | 11/2000 | Haggard et al. | 709/224 |
| 6,167,438 | A * | 12/2000 | Yates et al. | 709/216 |
| 6,185,598 | B1 * | 2/2001 | Farber et al. | 709/200 |
| 6,271,845 | B1 * | 8/2001 | Richardson | 715/764 |
| 6,317,788 | B1 * | 11/2001 | Richardson | 709/224 |
| 6,336,147 | B1 * | 1/2002 | Brownell et al. | 719/310 |
| 6,438,652 | B1 * | 8/2002 | Jordan et al. | 711/120 |
| 6,446,123 | B1 * | 9/2002 | Ballantine et al. | 709/224 |
| 6,477,667 | B1 * | 11/2002 | Levi et al. | 714/57 |
| 6,526,521 | B1 * | 2/2003 | Lim | 714/4.4 |
| 6,557,035 | B1 * | 4/2003 | McKnight | 709/224 |
| 6,604,046 | B1 * | 8/2003 | Van Watermulen et al. | 701/533 |
| 6,658,586 | B1 * | 12/2003 | Levi | 714/4.3 |
| 6,754,664 | B1 | 6/2004 | Bush | |
| 6,769,023 | B1 * | 7/2004 | Novaes et al. | 709/224 |
| 6,771,648 | B1 * | 8/2004 | Kim et al. | 370/395.2 |
| 6,789,203 | B1 * | 9/2004 | Belissent | 726/22 |
| 6,816,910 | B1 * | 11/2004 | Ricciulli | 709/237 |
| 6,985,937 | B1 * | 1/2006 | Keshav et al. | 709/223 |
| 7,003,769 | B1 * | 2/2006 | Yoshimura et al. | 718/100 |
| 7,143,180 | B2 * | 11/2006 | Chaar et al. | 709/235 |
| 7,225,250 | B1 * | 5/2007 | Harrop | 709/224 |
| 7,249,179 | B1 * | 7/2007 | Romero et al. | 709/226 |
| 7,324,447 | B1 * | 1/2008 | Morford | 370/231 |
| 7,373,644 | B2 * | 5/2008 | Aborn | 718/105 |
| 7,398,317 | B2 * | 7/2008 | Chen et al. | 709/229 |
| 2001/0052087 | A1 * | 12/2001 | Garg et al. | 714/37 |
| 2002/0001307 | A1 * | 1/2002 | Nguyen et al. | 370/386 |
| 2002/0054169 | A1 * | 5/2002 | Richardson | 345/854 |
| 2002/0059454 | A1 * | 5/2002 | Barrett et al. | 709/245 |
| 2002/0101819 | A1 * | 8/2002 | Goldstone | 370/232 |
| 2002/0103969 | A1 * | 8/2002 | Koizumi et al. | 711/114 |
| 2002/0156884 | A1 * | 10/2002 | Bertram et al. | 709/224 |
| 2002/0161680 | A1 * | 10/2002 | Tarnoff | 705/35 |
| 2002/0161868 | A1 * | 10/2002 | Paul et al. | 709/221 |
| 2002/0178262 | A1 * | 11/2002 | Bonnell et al. | 709/225 |
| 2002/0178383 | A1 * | 11/2002 | Hrabik et al. | 713/201 |
| 2002/0184065 | A1 * | 12/2002 | Menard et al. | 705/7 |
| 2002/0184362 | A1 * | 12/2002 | Banerjee et al. | 709/224 |
| 2002/0194251 | A1 * | 12/2002 | Richter et al. | 709/105 |
| 2002/0198961 | A1 * | 12/2002 | Krishnamurthy et al. | 709/217 |
| 2002/0198984 | A1 * | 12/2002 | Goldstein et al. | 709/224 |
| 2002/0198985 | A1 * | 12/2002 | Fraenkel et al. | 709/224 |
| 2003/0002503 | A1 * | 1/2003 | Brewer et al. | 370/392 |
| 2003/0009464 | A1 * | 1/2003 | Campbell et al. | 707/10 |
| 2003/0023722 | A1 * | 1/2003 | Vinberg | 709/224 |
| 2003/0046396 | A1 * | 3/2003 | Richter et al. | 709/226 |
| 2003/0065986 | A1 * | 4/2003 | Fraenkel et al. | 714/47 |
| 2003/0069974 | A1 * | 4/2003 | Lu et al. | 709/226 |
| 2003/0074606 | A1 * | 4/2003 | Boker | 714/42 |
| 2003/0084166 | A1 * | 5/2003 | Hosoi | 709/229 |
| 2003/0084349 | A1 * | 5/2003 | Friedrichs et al. | 713/201 |
| 2003/0101265 | A1 * | 5/2003 | Dantzig et al. | 709/226 |
| 2003/0110103 | A1 * | 6/2003 | Sesek et al. | 705/28 |
| 2003/0115244 | A1 * | 6/2003 | Molloy et al. | 709/105 |
| 2003/0145226 | A1 * | 7/2003 | Bruton et al. | 713/201 |
| 2003/0145232 | A1 * | 7/2003 | Poletto et al. | 713/201 |
| 2003/0158940 | A1 * | 8/2003 | Leigh | 709/226 |
| 2004/0013112 | A1 * | 1/2004 | Goldberg et al. | 370/389 |
| 2004/0024861 | A1 * | 2/2004 | Coughlin | 709/224 |
| 2004/0034704 | A1 * | 2/2004 | Connelly | 709/224 |
| 2004/0044771 | A1 * | 3/2004 | Allred et al. | 709/227 |
| 2004/0088412 | A1 * | 5/2004 | John et al. | 709/226 |

OTHER PUBLICATIONS

Mogul, Jeffrey C. The case for persistent-connection HTTP. vol. 25. No. 4. ACM, 1995.*

Padmanabhan, Venkata N., and Jeffrey C. Mogul. "Improving HTTP latency." Computer Networks and ISDN Systems 28.1 (1995): 25-35.*

Schuba, Christoph L., et al. "Analysis of a denial of service attack on TCP." Security and Privacy, 1997. Proceedings., 1997 IEEE Symposium on. IEEE, 1997.*

Terai, Tatsuhiko. "Dynamic Resource Management Scheme for TCP Connections at Internet Servers." (2002).*

Stephenson, Investigating Computer-Related Crime, Chapter 4 and Appendix A, CRC Press LLC, http://vvww.infosecuritynetbase.com, two pages. Copyright 2000.*

Symantec. "Norton Antivirus Corporate Edition Implementation Guide," Version 7.5, Symantec Corporation, 46 pages (copyright 1999-2000).*

Voigt, Thiemo, and Per Gunningberg. "Kernel-based control of persistent web server connections." ACM Sigmetrics Performance Evaluation Review 29.2 (2001): 20-25.*

Voigt, Thiemo, et al. "Kernel Mechanisms for Service Differentiation in Overloaded Web Servers." USENIX Annual Technical Conference, General Track. 2001.*

* cited by examiner

SERVER RESOURCE MANAGEMENT, ANALYSIS, AND INTRUSION NEGOTIATION

RELATED APPLICATIONS

This application is a continuation of U.S. patent application Ser. No. 13/790,198, now U.S. Pat. No. 8,763,119 entitled SERVER RESOURCE MANAGEMENT, ANALYSIS, AND INTRUSION NEGOTIATION filed Mar. 8, 2013, which is incorporated herein by reference for all purposes, which is a divisional of U.S. patent application Ser. No. 12/027,210, now U.S. Pat. No. 8,397,296 entitled SERVER RESOURCE MANAGEMENT, ANALYSIS, AND INTRUSION NEGATION filed Feb. 6, 2008, which is incorporated herein by reference for all purposes, which is a continuation of U.S. patent application Ser. No. 10/290,961, now U.S. Pat. No. 7,353,538 entitled SERVER RESOURCE MANAGEMENT, ANALYSIS, AND INTRUSION NEGATION filed Nov. 8, 2002, which is incorporated herein by reference for all purposes.

BACKGROUND OF THE INVENTION

A. Field of the Invention

The present invention relates generally to computer networks, and more particularly, to resource management of server computers in a public network such as the internet.

B. Description of Related Art

Network computer servers, such as computers that transmit HTML (HyperText Markup Language) documents to client computing devices on the Internet, may interact and receive data requests from many different end-users. It is frequently important that these computer servers maintain high levels of uptime. For example, if a server for an e-commerce site fails to respond to user requests, the site may lose sales.

There are many reasons why a server, or a group of servers, may fail. For example, the server may experience software or hardware errors that cause the server to fail. Additionally, the server may experience resource-related problems, such as too many users trying to simultaneously communicate with the server. Such resource-related problems can be "natural" resource problems in which too many bona fide users are trying to access the system simultaneously or malicious problems such as denial of service (DoS) or distributed denial of service (DDoS) attacks. In a DoS or DDoS attack, a compromised system or a multitude of compromised systems flood a server with incoming messages in an attempt to overwhelm the available server resources. Legitimate users of the server may then be denied service by the server due so the overload of its resources.

Accordingly, server system availability is an important concern for network servers, such as Internet servers. Conventional hardware solutions, such as clustering and failover, offer some assurances in this area by offering more resources to the users. However, these solutions can fail when faced with automated DoS and DDoS attacks that simply keep taking resources.

Accordingly, there is a need in the art to improve resource management in the face of attacks on system resources.

SUMMARY OF THE INVENTION

Systems and methods consistent with the principles of this invention implement a console host intrusion negation system (CHAINS) that monitors selected resources on one or more computer servers and throttles back resource usage when a server resource is overburdened.

A method consistent with an aspect of the invention includes monitoring resources associated with a network server and comparing activity levels of the resources to predetermined threshold activity levels. The method further includes reducing usage of one of the resources when the activity level associated with the resource increases above the predetermined threshold activity level.

A second aspect consistent with the invention is directed to a computer server that includes a processor, a communication interface, and a memory containing instructions. The instructions, when executed by the processor, cause the processor to monitor a usage level of the processor, the communication interface, and the memory. The Instructions additionally compare the usage level of the communication interface to a first threshold and throttle back a number of active network connections when the usage level of the communication interface is greater than the first threshold; compare the usage level of the memory to a second threshold and shutdown inactive processes when the usage level of the memory is above the second threshold; and compare the usage level of the processor to a third threshold and shut down inactive processes when the usage level of the processor is above the third threshold.

Yet another aspect of the present invention is directed to a system that includes a number of first computing devices and a second computing device. The first computing devices include a host software component configured to monitor resources of the first computing device and throttle back resource usage when resources of the first computing devices are being used above predetermined threshold levels. The second computing device includes a console software component configured to display alerts when the resources of the first computing devices are being used above the predetermined threshold levels.

Yet another aspect consistent with the present invention is directed to a method that includes displaying information relating to resources of remote computers, receiving information defining threshold levels for the resources at the remote computers, and transmitting the information defining the threshold levels for the resources to the remote computers. The remote computers throttle back resource usage when a resource usage level exceeds the threshold levels.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents of the claim features.

As described below, a console host and intrusion negation system (CHAINS) monitor selected resources on one or more computer servers. Chains may include one or more host software components and a console software component. The host component resides on a server computer and monitors resource usage at the server, if a particular resource is used at a level above a preset threshold, the host component may take remedial action. The remedial action may include, for example, throttling back the resource or notifying a user via the console component.

SYSTEM OVERVIEW

Figure 1:
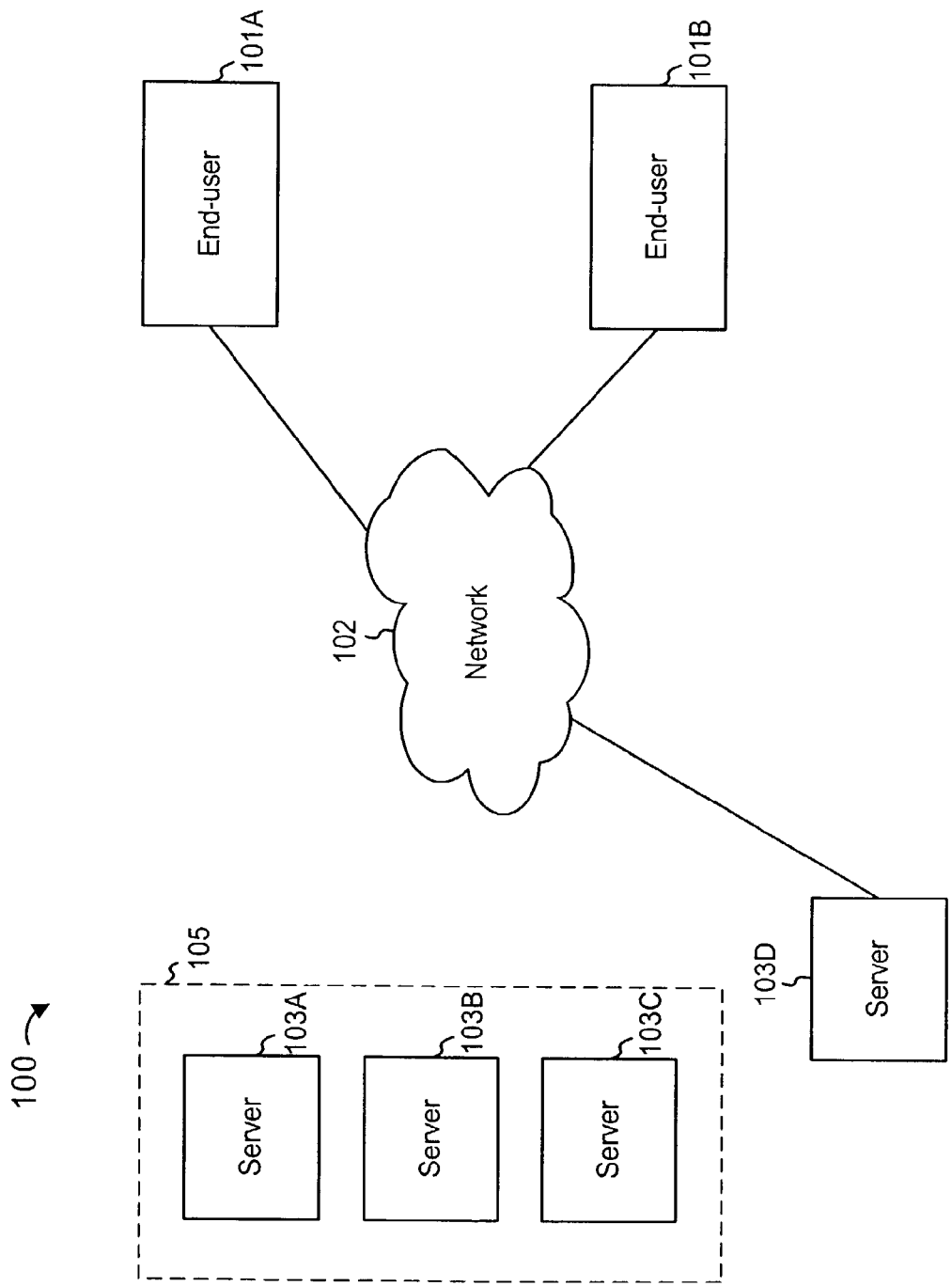
FIG. 1 is a diagram illustrating an exemplary system in which concepts, consistent with the invention may be implemented.

FIG. 1 is a diagram illustrating an exemplary system 100 in which concepts consistent with the present invention may be implemented. System 100 may include a number of end-user computing devices 101A and 101B, a network 102, and server computers 103A-103D (collectively referred to as servers 103). End-user computing devices 101 may include personal computers or the like through which users connect to network 102. Network 102 may include any type of network, such as a local area network (LAN), a wide area network (WAN), a virtual private network (VPN), an intranet, the internet or a combination of networks. End-user computing devices 101 and servers 103 may connect to network 102 via wired, wireless, and/or optical connections.

Servers 103 may respond to requests for information from end-user computing devices 101. For example, servers 103 may be HTML servers that interact with end-user computing devices 101 through hypertext transfer protocol (HTTP) sessions to transmit HTML, web pages to users. Server 103 may include a cluster of servers, such as the three servers 103A-103C contained in cluster 105. The servers 103A=103C in cluster 105 may include a load-balancing mechanism through which the servers may jointly handle requests from end-user computing devices 101 in such a manner as to balance the distribution of work among the servers in cluster 105.

Figure 2:
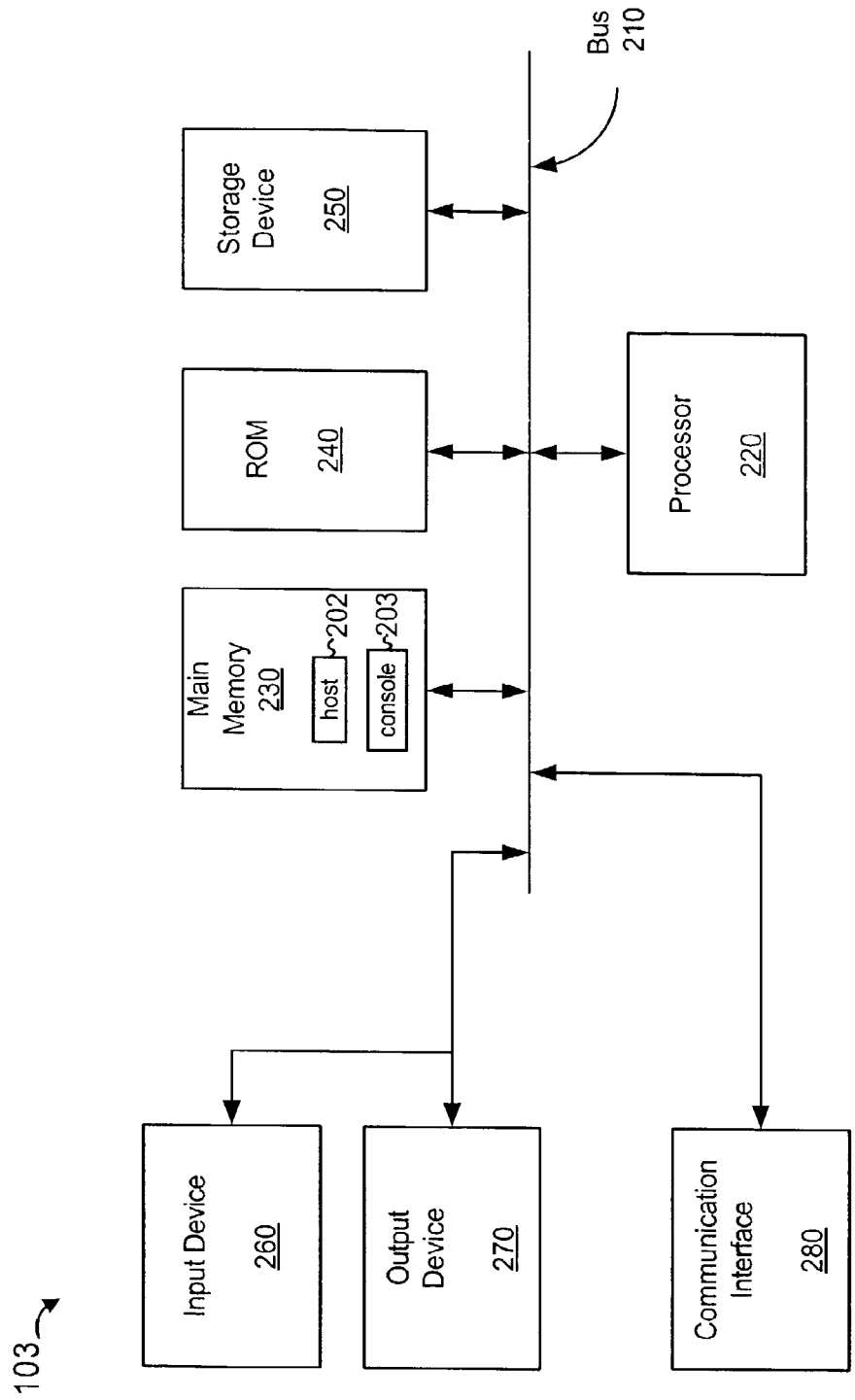
FIG. 2 is a diagram of an exemplary computing device that may correspond to one of the servers in FIG. 1.

FIG. 2 is a diagram of an exemplary computing device that may correspond to one of servers 103. Server 103 may include bus 210, processor 220, main memory 230, read only memory (ROM) 240, storage device 250, input device 260, output device 270, and communication interface 280. Bus 210 permits communication among the components of server 103.

Processor 220 may include any type of conventional processor or microprocessor that interprets and executes instructions. Main memory 230 may include a random access memory (RAM) or another type of dynamic storage device that stores information and instructions for execution fey processor 220. ROM 240 may include a conventional ROM device or another type of static storage device that stores static information and instructions for use by processor 220. Storage device 250 may include a magnetic and/or optical recording medium and its corresponding drive.

Input device 260 may include one or more conventional mechanisms that permit an operator to input information to computing device 103, such as a keyboard, a mouse, a pen, a number pad, a microphone and/or biometric mechanisms, etc. Output device 270 may include one or more conventional mechanisms that output information to the operator, including a displays printer, speakers, etc. Communication interface 280 may include any transceiver-like mechanism that enables computing device 103 to communicate with other devices and/or systems. For example, communication interface 280 may include mechanisms for communicating with another device or system via a network, such as network 102.

In one implementation, main memory 230 may include computer programming instructions that implement a CHAINS host software component 202 and/or console software component 203. The operation of host component 202 and console component 203 will be described in more detail below.

CHAINS

Figure 3:
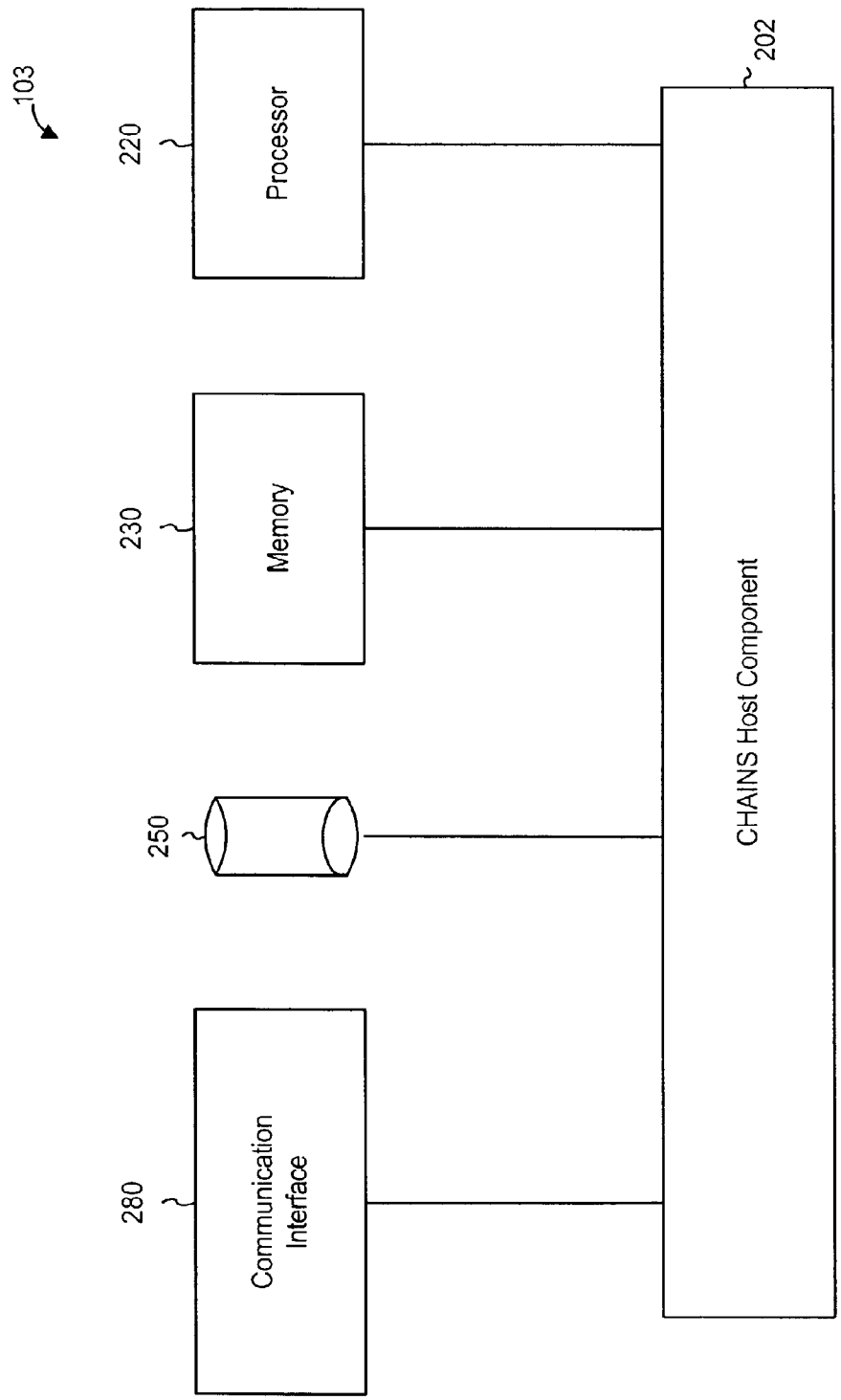
FIG. 3 is a diagram conceptually illustrating the interaction of a host component with elements of the server shown in FIG. 2.

FIG. 3 is a diagram conceptually illustrating the interaction of CHAINS host component 202 with resources associated with server 103. In particular, host component 202 may interact with communication interface 280, storage device 250, memory 230, and processor 220. In general, these elements of server 103 can be considered to be resources of server 103. Host component 202 monitors and controls the activity level of these resources.

Figure 4:
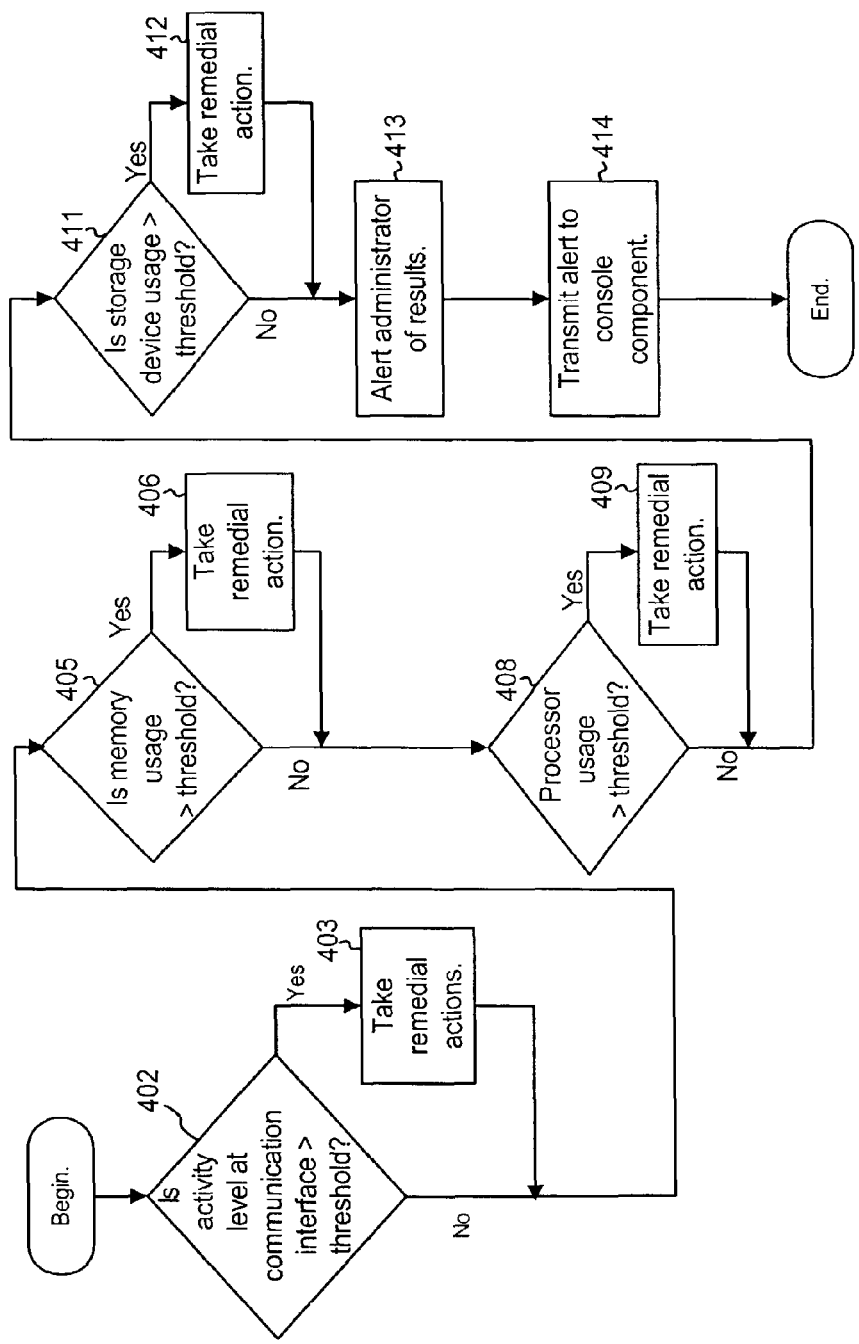
FIG. 4 is a flow chart illustrating operation of a host component consistent with an aspect of the invention.

FIG. 4 is a flow chaw illustrating operation of host component 202 consistent with an aspect of the invention. Host component 202 may begin by checking an activity level of communication interface 280. This may include checking the number of open connections between server 103 and end-user computing devices 101. An end-user computing device 101 that wishes to receive information from server 103 begins by transmitting a request for a connection with server 103. Server 103, in turn, can accept or reject the connection. Additionally, server 103 may keep track of the number of open connections at any particular time.

Host component 202 maintains a threshold level relating to the activity level of communication interface 280. The threshold level may be set by a user either locally at server 103 or, as will be described in more detail below, from a remote computer running console component 203. The threshold level may be derived manually by the user, or automatically, based on historical activity levels. Host component 202 may check to determine whether the activity level of communication interface 280 is above the threshold (Act 402). If it is, host component 202 may take remedial actions to effectively throttle back the number of active connections (Act 403). Such actions can include closing open connections, for example, host component 202 may first close connections that are open but inactive. If the number of connections is still too high, host component 202 may close connections that the server 103 classifies as lower priority connections. If the number of connections is still too high, host component 202 may begin to randomly close open connections. In addition, while the number of open connections is above the threshold, host component 202 may refuse any new connection requests from end-user computing devices 101.

In addition to checking an activity level of communication interface 280, host component 202 may check usage of memory 230. When memory capacity exceeds a predetermined threshold level (e.g., b 95% of memory 230 is fail), host component 202 may take memory-related remedial actions (Acts 405 and 406). These actions, may include, for example, shutting down inactive processes (often referred to as zombie processes).

Host component 202 may also check processor usage. When the load on processor 220 is above a predetermined threshold (e.g., 90% of total processor capacity), host component 220 may take remedial actions (Acts 408 and 409). These actions may be similar to the actions taken in Act 406, and may include, for example, shutting down inactive processes or shutting down lower priority processes.

Host component 202 may also check the capacity of storage device 250, such as a hard disk drive(s). When storage device 230 has exceeded a predetermined threshold capacity (e.g., 95% of capacity), host component 220 may again take remedial action, (Acts 411 and 412), such as redirecting future, disk write commands to console (i.e., to a monitor) or compressing non-critical files, such as log files.

Host component 202 may alert administrators of the actions taken in Acts 403, 406, 409, and 412 (Act 413). The alert may take the form of an e-mail, a pager notice, or a screen alert to an operator. Additionally, host component 202 may transmit an indication of the alert to a remote computer (Act 414). More particularly, consistent with an aspect of the invention, console component 203, residing at the remote computer, may receive the alert. Console component 203 may be configured to receive and monitor alerts from a number of host components 202 running on a number of different servers 103. This aspect of the invention is described in more detail below.

One of ordinary skill in the art will recognize that commands to check processor load, storage device load, and network connection load are well known, and are thus not described in detail herein.

Figure 5:
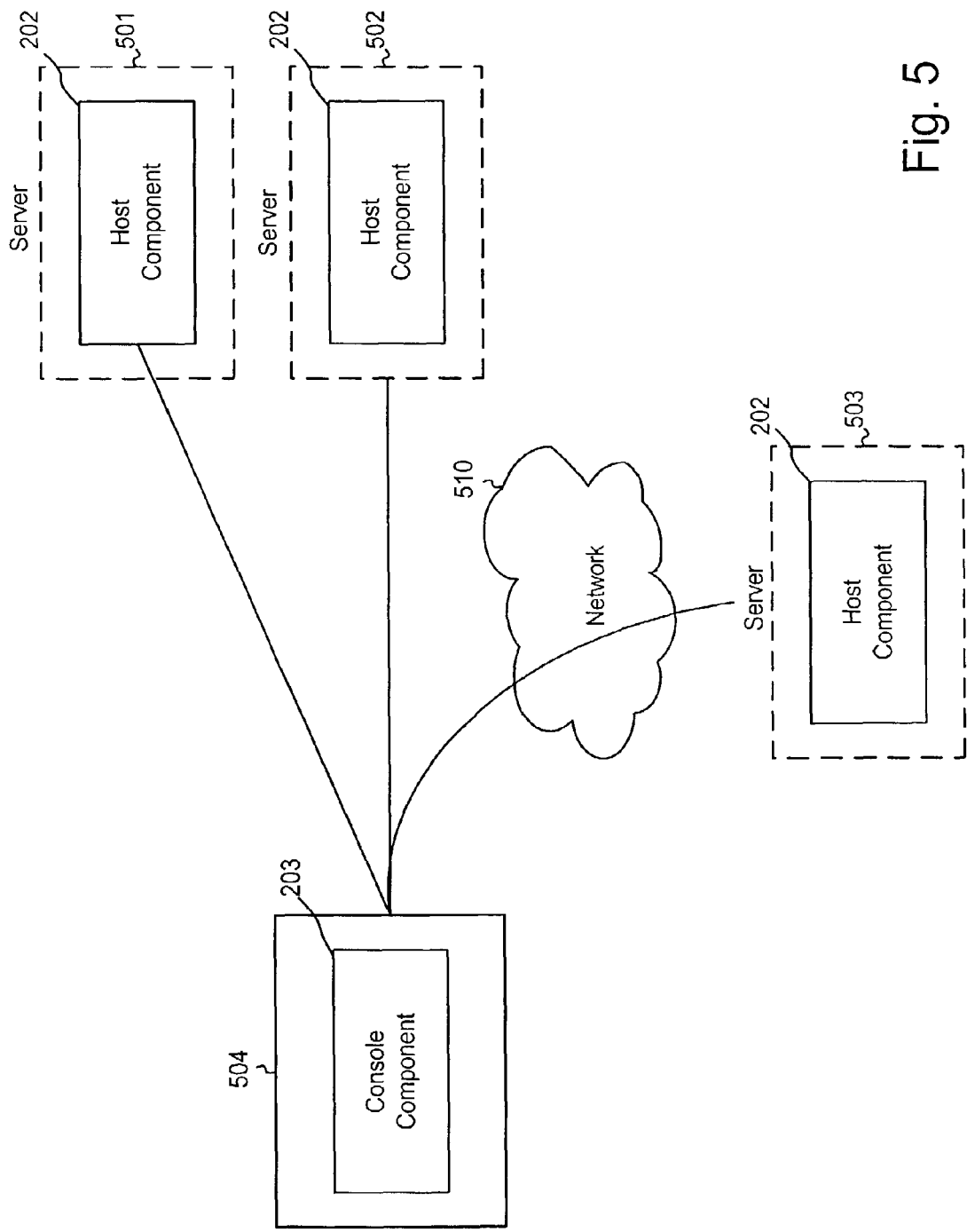
FIG. 5 is a diagram illustrating an implementation of a console component consistent with aspects of the invention.

FIG. 5 is a diagram illustrating an implementation of console component 203 consistent with aspects of the invention. Console component 203 may execute on a computing device 504, such as a server computer 103, and communicate with one or more host components 202. As shown in FIG. 5, console component 203 is connected to a number of host components 202, executing at servers 501-503.

Servers 501 and 502 may be a group of clustered servers that are connected locally or through a local area network to console component 203. Server 503 may be coupled remotely to console component 203 via wide area network 510.

Each of host components 202 may operate to transmit information relating to their generated alerts (see FIG. 4, Act 414). Operators local to console component 203 may view the alert information from multiple host components 202 and manage threshold settings for the host components 202.

Figure 6:
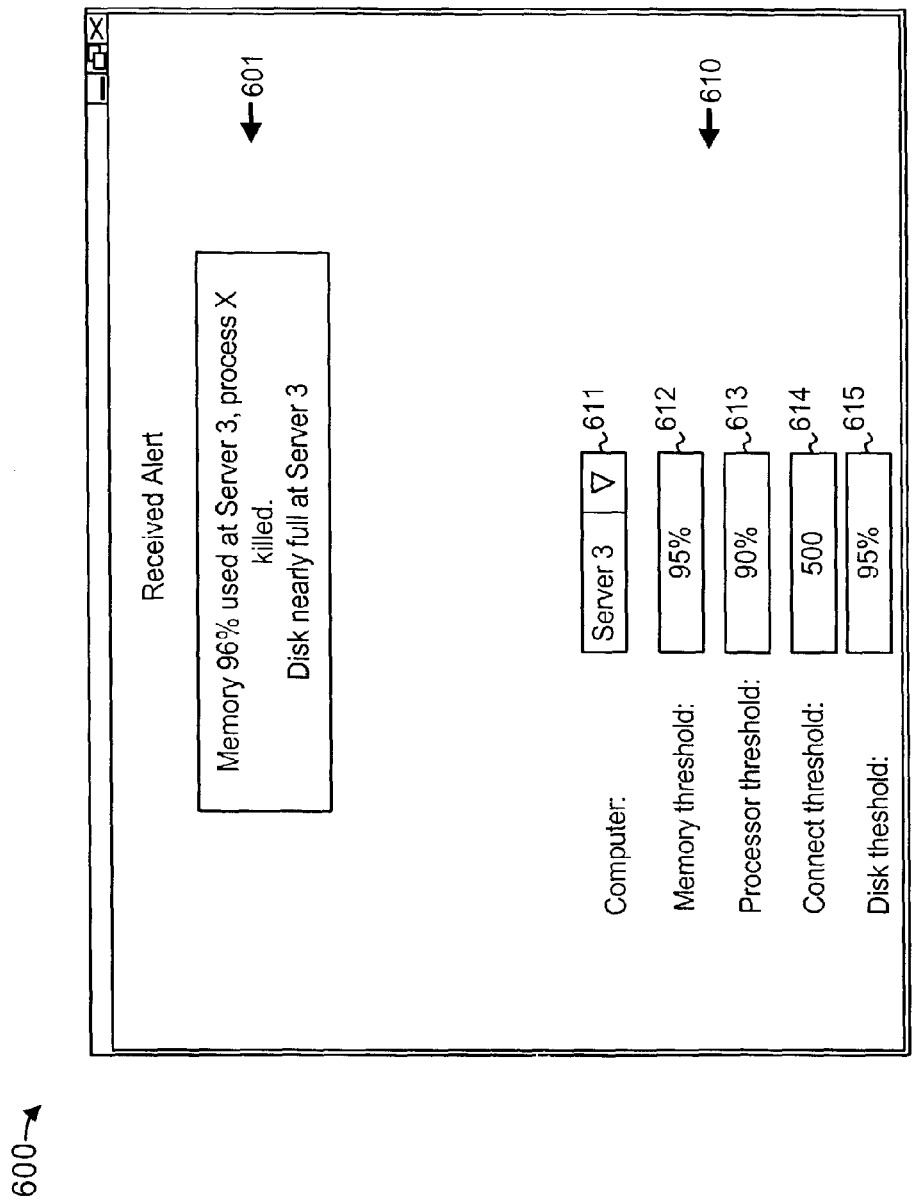
FIG. 6 is a diagram illustrating as exemplary graphical user interface (GUI) that may be displayed by the console component.

FIG. 6 is a diagram illustrating an exemplary graphical user interface (GUI) 600 that may be displayed by console component 203. GUI 600 may include an output section 601 and input section 610. Console component 203 may display alerts received from host components 202 to output section 601. In input section 610, operators may change configuration information, such as the threshold values, for a particular host component 202. Input section 610 may include a selection box 611 through which the user may select the host component 202 that the user is configuring. As shown in FIG. 6, the host component 202 at the server called "Server3" is being configured, input section 610 may additionally include input boxes 612-615 for inputting threshold information relating to the memory usage threshold, the processor usage threshold, the connection threshold, and the disk usage threshold, respectively.

In addition to merely monitoring and logging resource alerts from host components 202, console component 203 may provide analysts and resource management functions. For example, console component 203 may correlate resource alerts from multiple host components 202. If a number of host components 202 generate similar resource alerts at approximately the same time, this may indicate that a concerted DoS attack is being performed against these computers. Console component 203 may then output information to a user indicating a possible DoS attack.

In some implementations, console component 203 may reallocate resources among servers based on alerts received from host components 202. For example, if host component 202 at server 501 issues a disk resource alert, console component 203 may instruct server 501 to begin using the disk resources of server 502.

CONCLUSION

The CHAINS components described above operate to ensure that servers do not crash because of issues relating to resource overload. By constantly monitoring resources of various servers and throttling back resource access when the resources of a server are over taxed, the CHAINS component helps to ensure that the server will continue to operate.

Sometimes the best method for preventing attacks such as DoS and DDoS attacks is to prevent the attack from occurring in the first place. By keeping servers under DoS and DDoS attacks from failing, an attacker may give up and move on to a more susceptible target.

The foregoing description of preferred embodiments of the invention provides illustration and description, hut is not intended to be exhaustive or to limit the invention to the precise form disclosed. Modifications and variations are possible in light of the above teachings or may be acquired from practice of the invention. Moreover, while a series of acts have been presented with respect to FIG. 4, the order of the acts may fee different in other implementations consistent with the present invention. Moreover, non-dependent acts may be performed in parallel.

Certain portions of the invention have been described as software that performs one or more functions. The software may more generally be implemented as any type of logic. This logic may include hardware, such as an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" Of similar language is used.

The scope of the invention is defined by the claims and their equivalents.

The invention claimed is:

1. A method comprising:
monitoring a plurality of resources associated with a network server, the plurality of resources including a communication interface of the network server and a processor of the network server, wherein monitoring the plurality of resources includes determining a number of open network connections using the communication interface of the network server;
comparing activity levels of the plurality of resources to predetermined threshold activity levels; and
reducing usage of one of the plurality of resources when the activity level associated with the one of the plurality of resources increases above the predetermined threshold activity level associated therewith, wherein reducing usage of the one of the plurality of resources includes:
reducing the number of open network connections to obtain a first number of open network connections by closing open network connections based on a priority of the open network connections, shutting down an open but inactive network connection, and refusing to open new network connections;
comparing the first number of open network connections with a number of open network connections threshold; and in the event that the first number of open network connections is greater than or equal to the number of open network connections threshold, randomly close an open network connection.

2. The method of claim 1, wherein monitoring the plurality of resources includes determining usage of the processor of the network server, and wherein reducing usage of the one of the plurality of resources includes reducing a load on the processor by shutting down an inactive process and/or shutting down lower priority processes.

3. The method of claim 1, wherein the plurality of resources includes a storage device associated with the network server, and wherein monitoring the plurality of resources includes determining usage of the storage device associated with the network server.

4. The method of claim 1, wherein the plurality of resources includes a storage device associated with the network server, wherein monitoring the plurality of resources includes determining usage of the storage device associated with the network server, and wherein reducing usage of the one of the plurality of resources includes redirecting future disk write commands to a monitor and/or compressing log files.

5. The method of claim 1, wherein the plurality of resources includes a memory associated with the network server, and wherein monitoring the plurality of resources includes determining usage of the memory associated with the network server.

6. The method of claim 1, wherein the plurality of resources includes a memory associated with the network server, wherein monitoring the plurality of resources includes determining usage of the memory associated with the network server, and wherein reducing usage of the one of the plurality of resources includes reducing the usage of the memory by shutting down inactive processes.

7. The method of claim 1, further comprising alerting a user when the activity level associated with the one of the plurality of resources increases above the predetermined threshold activity level.

8. The method of claim 1, further comprising alerting a user when the activity level associated with the one of the plurality of resources increases above the predetermined threshold activity level, wherein alerting the user includes transmitting an alert to a remote computer.

9. The method of claim 1, wherein the predetermined threshold activity levels are received from a remote computer.

10. The method of claim 1, wherein the reducing of the number of open network connections to obtain a first number of open network connections comprises:
performing the closing of the open network connections based on the priority of the open network connection before the shutting down of the open but inactive network connection.

11. A system comprising:
a communication interface of a network server;
a processor of the network server; and
a host component executed on the processor for:
monitoring a plurality of resources associated with the network server, the plurality of resources including the communication interface of the network server and the processor of the network server, wherein monitoring the plurality of resources includes determining a number of open network connections using the communication interface of the network server;
comparing activity levels of the plurality of resources to predetermined threshold activity levels; and
reducing usage of one of the plurality of resources when the activity level associated with the one of the plurality of resources increases above the predetermined threshold activity level associated therewith, wherein reducing usage of the one of the plurality of resources includes:
reducing the number of open network connections to obtain a first number of open network connections by closing open network connections based on a priority of the open network connections, shutting down an open but inactive network connection, and refusing to open new network connections;
comparing the first number of open network connections with a number of open network connections threshold; and
in the event that the first number of open network connections is greater than or equal to the number of open network connections threshold, randomly close an open network connection.

12. The system recited in claim 11, wherein monitoring the plurality of resources includes determining usage of the processor of the network server, and wherein reducing usage of the one of the plurality of resources includes reducing a load on the processor by shutting down an inactive process and/or shutting down lower priority processes.

13. The system recited in claim 11, further comprising a storage device associated with the network server, wherein the plurality of resources includes the storage device associated with the network server, and wherein monitoring the plurality of resources includes determining usage of the storage device associated with the network server.

14. The system recited in claim 11, further comprising a storage device associated with the network server, wherein the plurality of resources includes the storage device associated with the network server, wherein monitoring the plurality of resources includes determining usage of the storage device associated with the network server, and wherein reducing usage of the one of the plurality of resources includes redirecting future disk write commands to a monitor and/or compressing log files.

15. The system recited in claim 11, further comprising a memory associated with the network server, wherein the plurality of resources includes the memory associated with the network server, and wherein monitoring the plurality of resources includes determining usage of the memory associated with the network server.

16. The system recited in claim 11, further comprising a memory associated with the network server, wherein the plurality of resources includes the memory associated with the network server, wherein monitoring the plurality of resources includes determining usage of the memory associated with the network server, and wherein reducing usage of the one of the plurality of resources includes reducing the usage of the memory by shutting down inactive processes.

17. The system recited in claim 11, further comprising the host component executed on the processor for alerting a user when the activity level associated with the one of the plurality of resources increases above the predetermined threshold activity level.

18. The system recited in claim 11, further comprising the host component executed on the processor for alerting a user when the activity level associated with the one of the plurality of resources increases above the predetermined threshold activity level, wherein alerting the user includes transmitting an alert to a remote computer.

19. The system recited in claim 11, wherein the predetermined threshold activity levels are received from a remote computer.

\* \* \* \* \*